Patented May 18, 1926.

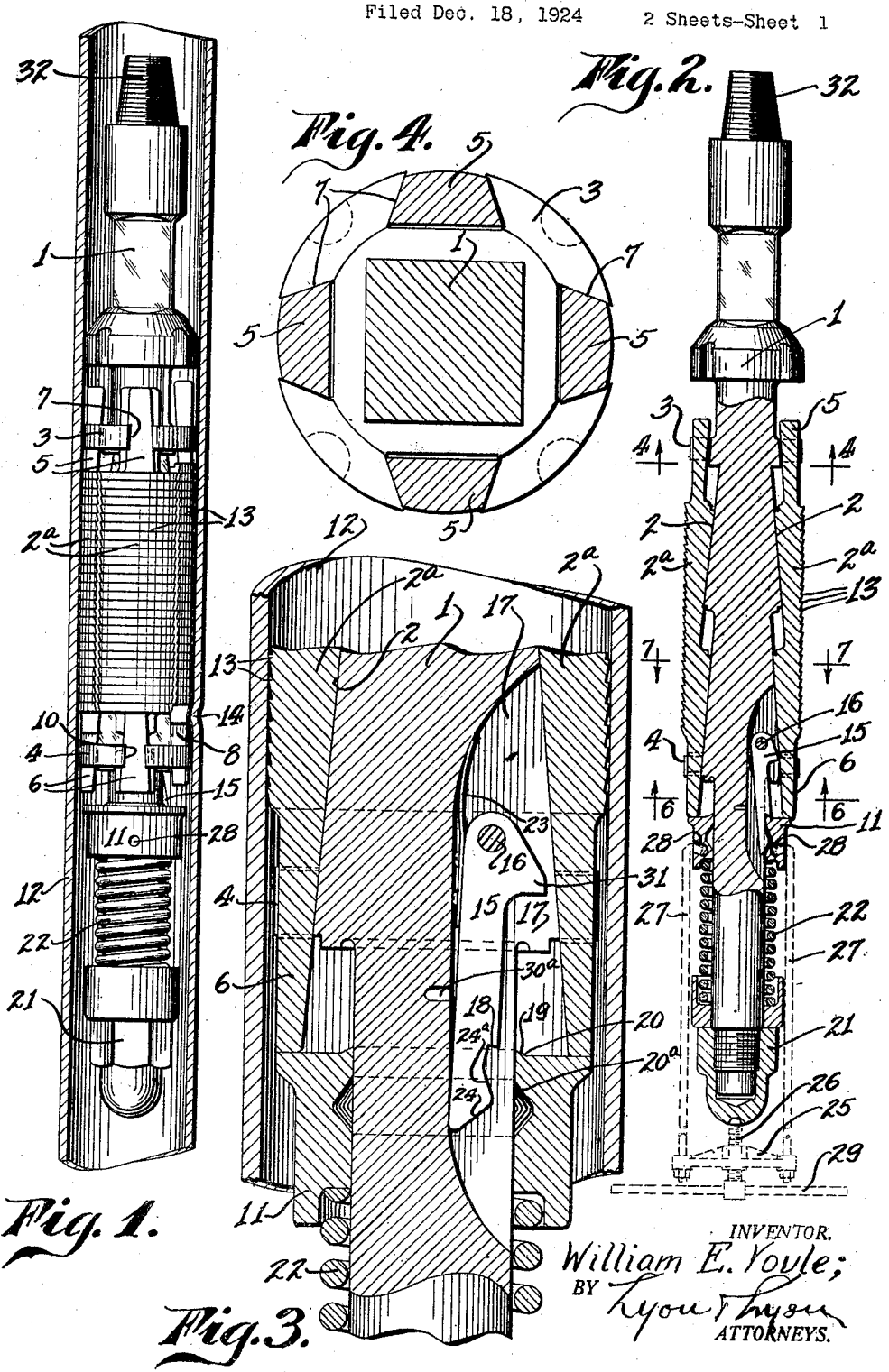

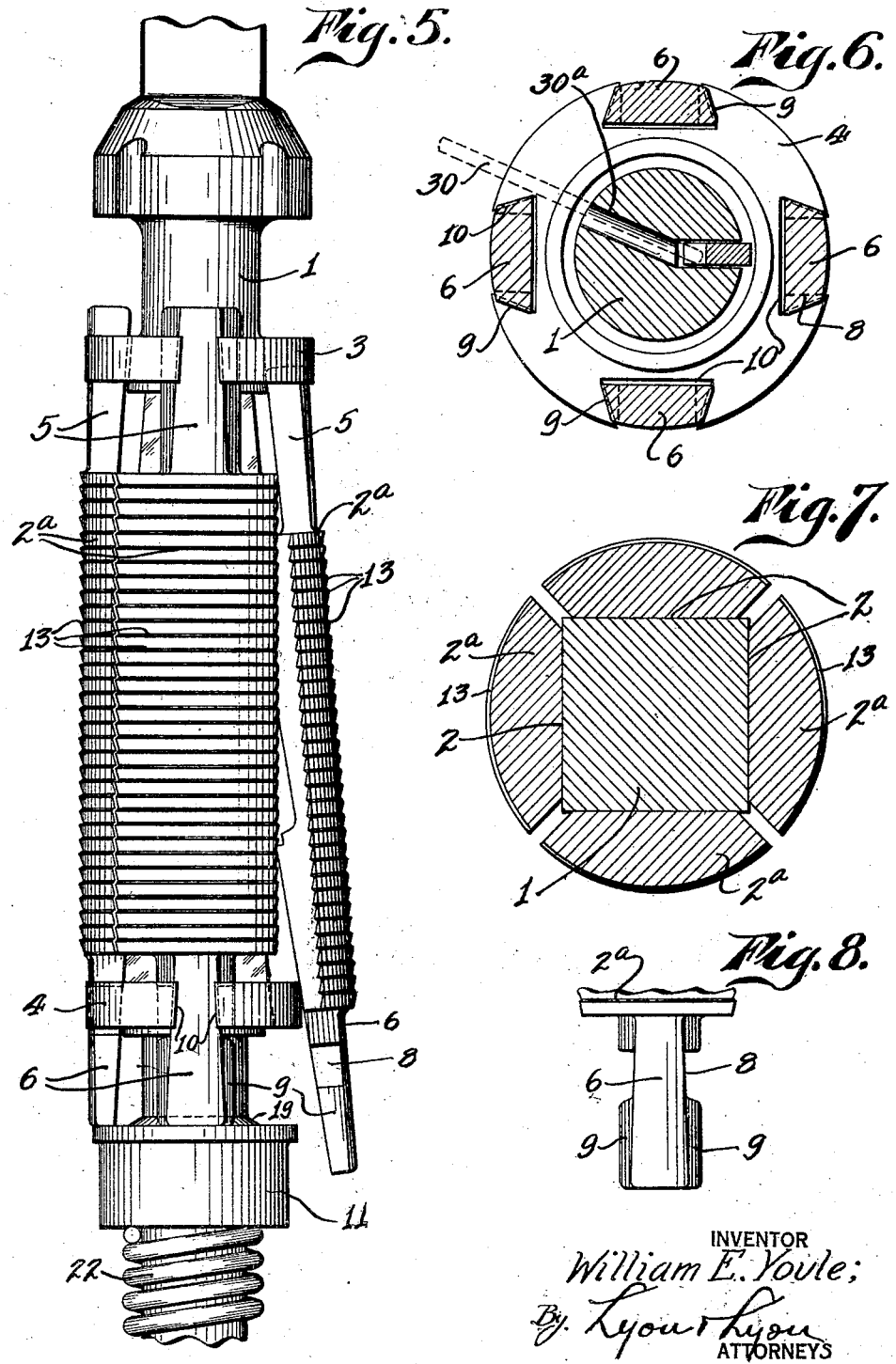

1,585,069

UNITED STATES PATENT OFFICE.

WILLIAM E. YOULE, OF LOS ANGELES, CALIFORNIA.

CASING SPEAR.

Application filed December 18, 1924. Serial No. 756,675.

This invention relates to casing spears and particularly to casing spears of the type described in my Patent No. 1,377,301, which was issued to me May 10, 1921. In this type of casing spear, the slips are guided on the body at their upper and lower ends respectively; a bowl guided on the body is capable of engaging the slips and may be actuated by a spring to move the slips away from the casing after they have been disengaged from it by a down jar. The general object of this invention is to provide an improved construction for a casing spear of this type; also to provide improved means for guiding the slips and for facilitating their being attached to the casing spear body; also to provide improved trigger means for holding the bowl away from the slips when the spear is being passed down the casing, and to provide a construction for the trigger means which will greatly facilitate the setting of the bowl in engagement with the trigger. A further object of the invention is to improve the general construction of casing spears.

Further objects of the invention will appear hereinafter.

The invention consists in the novel parts and combination of parts to be described hereinafter, all of which contribute to produce an efficient casing spear.

A preferred embodiment of the invention is described in the following specification, while the broad scope of the invention is pointed out in the appended claims.

In the drawings:

Fig. 1 is a side elevation of a casing spear embodying my invention and showing a short portion of casing within which the casing spear is represented; this view particularly illustrates the mode of operation of the slips in permitting the casing spear to pass a blister or projection on the inner side of the wall of the casing.

Fig. 2 is a vertical section through the lower portion of the casing spear and illustrating the manner of use of a setting tool for setting the bowl in engagement with the trigger means.

Fig. 3 is a vertical section upon an enlarged scale, showing the portion of the casing spear which is contiguous to the trigger means, and also showing a portion of the casing, the parts being in the relation which they have when the slips are gripping the casing.

Fig. 4 is a cross section upon an enlarged scale, taken on the line 4—4 of Fig. 2.

Fig. 5 is a side elevation of the casing spear, and particularly illustrating the manner of attaching the slips to the casing spear body.

Fig. 6 is a cross section upon an enlarged scale, taken on the line 6—6 of Fig. 2.

Fig. 7 is a cross section upon an enlarged scale, taken on the line 7—7 of Fig. 2.

Fig. 8 is a side elevation of the lower portion of one of the slips, illustrating a detail of its construction.

In practicing my invention, I provide a body having slipways, with slips guided on the slipways having a collapsed position, and also having an expanded position—in the latter they engage the wall of the casing. I also provide means mounted to move longitudinally of the body and capable of engaging the slips. In the operation of the device, trigger means mounted on the side of the body engages the last named means to hold the same away from the slips while the spear is passing down the casing; the body of the spear and the slips are so constructed that they will cooperate upon an up jar of the body to move the slips into their expanded position, and this up jar also effects the release of the trigger means and permits the spring to cooperate with the slips thereafter, when a down jar occurs, to move the slips away from the wall of the casing.

I provide the body of the device with fixed interlocking means, and provide slips with corresponding interlocking means permitting the slips to be moved laterally onto the slipways when held at a certain elevation; after the slips have been moved onto the slipways if they are moved up or down, the two interlocking means cooperate to interlock thereafter and retain the slips on the body.

In order to accomplish this, I provide a body 1 in the form of a mandrel, the middle portion of which is provided with a plurality of slipways 2 which in the present instance are four in number. These slipways preferably converge in an upward direction, and each of the four slipways is preferably of the stepped or interrupted type which was described in my patent referred to above.

On the body, above and below the slipways, I provide retaining means 3 and 4 for the slips 2ª, which cooperate respectively with retaining tongues 5 which are of substantially uniform cross-section, and extend up from the upper ends of the slips, and similar retaining tongues 6 which extend down from the lower ends of the slips, the retaining means 3 and 4 being in the form of collars formed on the body, and the upper retaining means or collar 3 includes dovetailed grooves 7 which receive the tongues 5 loosely, that is to say, they will guide the tongues but at the same time they do not fit the tongues tightly, so that they will permit a lateral movement of the lower ends of the slips when placing them in position on their slipways (see Fig. 5). The other retaining means 4 is similarly constructed. Either the upper tongues 5 or the lower tongues 6 are constructed so as to permit them to be slid laterally into place in their retaining grooves. I prefer, however, to provide each lower tongue 6 with a reduced neck 8 (see Fig. 8) which is produced by cutting away the bevelled face 9 of the tongue on each side. In putting the slip in place, the upper tongue 5 is moved longitudinally, that is, it is shoved up from below into the collar 3 (see Fig. 5) until the reduced neck 8 comes opposite to the slot or groove 10 in the lower retaining collar 4, whereupon the slip will be swung inwardly so as to bring it to the bottom of the groove 10. By permitting the slip to descend a slight distance, the reduced neck 8 will be moved slightly out of alignment with the groove 10, and the groove will then operate to retain the lower end of the slip.

In the normal position of the parts, the lower ends of the slips are supported on a bowl preferably in the form of a collar 11 (see Fig. 5). This collar is engaged by the lower ends of the tongues 6 and supports all the slips in position. When the slips are in engagement with the collar in this way, the necks 8 will be out of alignment with the retaining collar 4, and hence the slips cannot fall out.

When the casing spear is passing down the casing 12 (see Fig. 1) the teeth 13 on the outer faces of the slips 2ª will drag on the inner wall of the casing 12 and if a projection or blister 14 should be encountered (see Fig. 1) the slip which it strikes will drag further up, which will move the slip inwardly somewhat and permit it to pass the blister. When a casing spear is passing down in this way, the drag of the casing on the slips will hold them slightly removed from the collar 11 or bowl (see Figs. 1 and 2).

In order to hold the bowl 11 in the set position, I provide trigger means including a trigger 15 which is mounted on a pivot 16 in the slot 17 in the side of the body 1 so that the trigger can swing in and out in a substantially radial direction. This trigger is provided with a shoulder 18 which will engage with the inner edge 19 of the collar 11 (see Figs. 2 and 3). The shoulder 18 is preferably slightly inclined and the edge 19 has a slightly inclined face 20 to correspond with the inclination of the shoulder 18 in order that a slight resistance would be offered in swinging the trigger inwardly to disengage the collar. In other words, the edge 19 of the collar inclines upwardly somewhat. The bowl includes a nut 21 secured to the lower end of the body, and between this nut and the moving collar 11 a spring 22 is provided which exerts its force in a direction to move the collar 11 toward the slips. The shoulder 18 of the trigger 15, however, will prevent the collar from moving up when the casing spear has been "set."

In the operation of the device, an up jar given to the body will operate to effect the gripping of the casing by the slips, and the relative downward movement of the slips which occurs with the up jar will result in bringing the lower ends of the slips against the collar 11; this holds the collar down as the body moves up in the up-jar movement and will effect a disengagement of the trigger 15 from the collar. As soon as this occurs, the spring 22 will exert its force to hold the collar 11 against the lower ends of the slips, but the slips will be very firmly wedged against the casing so that the spring 22 will not have any effect whatever tending to loosen the slips.

After the slips have been gripped with the casing in this way, the casing spear may be operated to raise the casing or perform any other of the usual operations. When it is desired to release the spear from the casing it is merely necessary to give the casing spear a down jar. This will slide the body downwardly with respect to the slips which are gripping the side of the casing, and will substantially disengage the slips from the casing, whereupon the spring 22, acting through the collar 11, will force all the slips upwardly on their slipways and move them further away from the wall of the casing. Furthermore, the spring will move the slips to such an elevation that they will not grip the casing again while the casing spear is being withdrawn from it.

In order to insure that the trigger 15 will withdraw from the path of the collar 11 when an up jar has released the collar 11 from the trigger, I prefer to provide the trigger with a cam edge 24ª which cooperates with a cam face 20ª on the collar 11. In the up-jar, the relative movement of these cams throws the trigger inwardly. I also provide a leaf spring 23 (see Fig. 3) which thrusts against the bottom of the slot or recess 17 and holds the trigger in the position shown in Fig. 3 as soon as it has been released.

In order to assist in the assembly of the parts, and particularly to facilitate setting of the collar 11 in its proper operating position, and to guide it up along the trigger 15, I prefer to provide the lower end of the trigger with a guide cam or nose 24 (see Fig. 3). This nose will facilitate bringing the collar into operative position and will also facilitate setting the trigger in engagement with the collar.

In order to set the collar and trigger, I prefer to employ a setting tool, such as shown in dotted lines in Fig. 2. This tool comprises a cross head 25, the middle of which is centered on the lower ends of the nut 21 by means of a feed screw 26. Hook rods 27 carried by the cross head 25 have hooks on their ends engaging into inclined sockets 28 on the outer side of the collar 11. By rotating the handle bar 29 of the feed screw it will be evident that the collar 11 can be drawn down and the spring 22 compressed.

The body 1 is constructed with means for rendering the trigger 15 accessible to set it in engagement with the collar. This is preferably accomplished by simply providing the body 1 with a drilled hole 30ª (see Fig. 6) which enables an instrument such as a wire 30 to be inserted from the exterior to engage the inner edge of the trigger; in setting the collar and trigger in engagement, the operator of the casing spear should keep the wire 30 pressed against the trigger so as to hold its nose 24 in the path of the edge 19. In order to accomplish this I prefer to provide means for limiting the outward movement of the trigger, and this means is in the form of a nose 31 (see Fig. 3) which will engage a part of the device, for example, the inner side of the lower tongue 6 of an adjacent slip 2ª. As the collar comes up, it will deflect the trigger and the edge 19 will eventually seat itself at the shoulder or notch 18.

This casing spear may be attached to the usual tool string by means of the usual tapered pin 32 at the upper end of the spear.

An important feature of my invention is the correlated construction of the slips and body; these parts are provided with interlocking means which permit the slips to be moved laterally onto the slipways when held at a certain elevation, but thereafter if the slips are moved up or down an interlocking occurs which prevents dislodgment of the slips and insures their being properly guided in the slipways.

Attention is called to the fact that if a spear embodies my improved slips, they may be attached or detached from the body without necessitating the removal of any other part.

It will also be evident that when the spear is passing down the casing, even if the casing dragged any slip up so that its reduced neck was opposite the retaining collar 4, the slip could not become detached because it would be held against outward movement by the casing itself.

It is understood that the embodiment of the invention described herein is only one of the many embodiments this invention may take, and I do not wish to be limited in the practice of the invention, nor in the claims, to the particular embodiment set forth.

What I claim is:—

1. In a casing spear, the combination of a body having slipways converging in an upward direction, slips guided on the body and mounted to slide up or down on the slipways, a bowl in the form of a collar mounted to slide on the body below the slips and capable of engaging the lower ends of the slips, a spring for forcing the collar upwardly and toward the slips, a trigger movably mounted in the side of the body and having a shoulder on its outer edge operating to engage the inner edge of the collar operating to hold the collar away from the slips while the spear is passing down the casing, said body and said slips cooperating upon an up jar of the body to effect the gripping of the casing by the slips, engage the collar with the slips, thereby releasing the trigger, said slips and body cooperating thereafter upon a down jar of the body to release the slips and permit the spring to move the slips upwardly and away from the casing, the lower end of said trigger having a nose with a cam edge to engage the inner edge of the collar when the collar is moved upwardly to set the trigger with the shoulder and the edge of the collar in engagement.

2. In a casing spear, the combination of a body having slipways converging in an upward direction, slips guided on the body and mounted to slide up or down on the slipways, a bowl in the form of a collar mounted to slide on the body below the slips and capable of engaging the lower ends of the slips, a spring for forcing the collar upwardly and toward the slips, a trigger movably mounted in the side of the body and having a shoulder on its outer edge operating to engage the inner edge of the collar operating to hold the collar away from the slips while the spear is passing down the casing, said body and said slips cooperating upon an up jar of the body to effect the gripping of the casing by the slips, engage the collar with the slips, thereby releasing the trigger, said slips and body cooperating thereafter upon a down jar of the body to release the slips and permit the spring to move the slips upwardly and away from the casing, the lower end of said trigger having a nose with a cam edge to engage the inner edge of the collar when the collar is moved upwardly to set the trigger with the shoulder and the edge of the collar in engagement, and a spring associated with the trigger to withdraw the same from the path of the collar when the up jar has released the collar from the trigger.

3. In a casing spear, the combination of a body having slipways converging in an upward direction, slips mounted to slide up or down on the slipways, each of said slips having a retaining tongue at its upper end and a retaining tongue at its lower end, said body having retaining means constructed to receive the tongues at one end of the slips by movement of the tongues longitudinally, and operating to hold the slips so as to permit a limited lateral movement of the other end of the slip in setting the same by a lateral movement onto its slipway, the tongue at the said other end of each slip having a reduced neck, said body having retaining means which may align with said reduced necks to permit each slip to be introduced by a lateral movement into the last named retaining means, said last named retaining means operating to prevent outward lateral movement of the slips after the same are in place, a bowl in the form of a collar mounted to slide on the body below the slips and capable of engaging the slips, a trigger carried by the body for engaging the collar to hold the same away from the slips while the spear is passing down the casing, a spring on the body to force the collar toward the slips, said body and said slips cooperating upon an up jar to effect a gripping of the casing by the slips and simultaneously engage the collar with the slips to release the collar from the trigger and thereby permit the spring to hold the collar against the slips while they are gripping the casing, said slips and said body cooperating thereafter upon the down jar of the body to release the slips from the casing and thereby permit the spring and collar to force the same upwardly and away from the casing.

4. In a casing spear, the combination of a body having slipways converging in an upward direction, slips mounted to slide up or down on the slipways, each of said slips having a retaining tongue at its upper end and a retaining tongue at its lower end, said body having retaining means constructed to receive the tongues at one end of the slips by movement of the tongues longitudinally, and operating to hold the slips so as to permit a limited lateral movement of the other end of the slip in setting the slip laterally onto its slipway, retaining means adjacent the other end of the slip to cooperate with the other tongue of each slip, the said other tongue of each slip having a reduced neck which may be aligned with the last named retaining means to permit each slip to be moved laterally inwardly onto its slipway, said slips having a normal position in which they rest on the collar with the reduced necks out of alignment with their corresponding retaining means.

5. In a casing spear, the combination of a body having slipways converging in an upward direction, slips mounted to slide up or down on the slipways, each of said slips having a dovetailed retaining tongue at its upper end and a dovetailed retaining tongue at its lower end, said body having retaining means adjacent one end of the slips, including a dovetailed groove corresponding to each adjacent retaining tongue constructed to receive the tongue by a longitudinal movement, and operating so as to permit a limited lateral movement of the other end of the slip in setting the same on its slipway, said body having retaining means adjacent the other ends of the slips including a dovetailed groove corresponding to its adjacent retaining tongue for guiding the slips along the slipways, the said tongues adjacent the last named retaining means having reduced necks enabling the slips to be moved laterally into position on to the slipways at that end, and means carried by the body for moving the slips on the slipways.

6. In a casing spear, the combination of a body having slipways converging in an upward direction, slips mounted to slide up or down on the slipways, each of said slips having a dovetailed retaining tongue at its upper end, said body having retaining means adjacent the said tongues including dovetailed retaining grooves constructed to receive the tongues by a longitudinal movement, and permitting a limited lateral movement of the lower end of each slip in setting the same on its slipway, each of said slips having a dovetailed retaining tongue at its lower end, said body having retaining means adjacent the lower tongues including a dovetailed groove corresponding to each lower tongue to receive and guide the same, each lower tongue having a reduced neck which may align with the last named retaining means to permit the slips to be moved laterally inwardly onto the other slipways, a bowl on the body below the slips for normally supporting them in position with the reduced necks out of alignment with the lower retaining means, said body and slips cooperating in lowering the casing spear so that the casing drags the slips upwardly and out of contact with the bowl, a spring exerting its force to move the bowl toward the slips, and trigger means cooperating with the bowl to hold the same down, and constructed to release the bowl upon the up jar which effects the gripping of the slips against the casing, said body and said slips cooperating upon a down jar thereafter to disengage the slips from the casing and permit the spring and bowl to force the same upwardly and away from the casing.

7. In a casing spear, the combination of a body having slipways converging in an upward direction, slips mounted to slide up or down on the slipways, a bowl having a collar movably mounted on the body and capable of engaging the slips, a spring for forcing the collar toward the slips, a trigger mounted in the side of the body and having a shoulder for engaging the collar to hold the same away from the slips when the casing spear is passing down the casing, said slips and said body cooperating upon an up jar of the body to effect the gripping of the casing by the slips and the release of the collar from the trigger to permit the spring to hold the collar against the slips thereafter, a trigger spring to move the trigger out of the path of the collar when the same is released, said slips and said body cooperating upon a down jar of the body to disengage the slips from the casing, said first named spring operating thereafter to move the slips upwardly and away from the casing, said body having means for rendering the trigger accessible to an instrument to move the same outwardly and into the path of the collar for resetting the trigger in engagement with the collar, said trigger having a nose operating to engage an adjacent part to limit the outward movement of the trigger in setting the same in engagement with the collar.

8. In a casing spear, the combination of a body having slipways converging in an upward direction, slips mounted to slide up or down on the slipways, a bowl having a collar movably mounted on the body and capable of engaging the slips, a spring for forcing the collar toward the slips, a trigger mounted in the side of the body and having a shoulder for engaging the collar to hold the same away from the slips when the casing spear is passing down the casing, said slips and said body cooperating upon an up jar of the body to effect the gripping of the casing by the slips and the release of the collar from the trigger to permit the spring to hold the collar against the slips thereafter, a trigger spring to move the trigger out of the path of the collar when the same is released, said slips and said body cooperating upon a down jar of the body to disengage the slips from the casing, said first named spring operating thereafter to move the slips upwardly and away from the casing, said body having means for rendering the trigger accessible to an instrument to move the same outwardly and into the path of the collar for resetting the trigger in engagement with the collar, said trigger having a nose for engaging an adjacent part to limit the outward movement of the trigger in setting the same in engagement with the collar, the lower end of said trigger having a cam edge for guiding the collar up along the trigger and into engagement with the shoulder when setting the trigger and collar in engagement.

9. A slip for a casing spear having a body portion with means on its outer face for gripping the wall of the casing and having a guide tongue of substantially uniform cross-section extending from one end, and a guide tongue extending from its other end having a reduced neck to facilitate its attachment to a casing spear body.

10. In a casing spear, the combination of a body, with slipways, slips on the slipways, fixed interlocking means on the body and interlocking means on the slips permitting the slips to be moved laterally onto the slipways when held at a certain elevation, said interlocking means cooperating to interlock thereafter and retain the slips when moved up or down on the slipways.

Signed at Los Angeles, California, this 11th day of December, 1924.

WILLIAM E. YOULE.